June 20, 1933.    J. A. TYNAN    1,914,931
GOGGLE ATTACHMENT
Filed Aug. 22, 1932
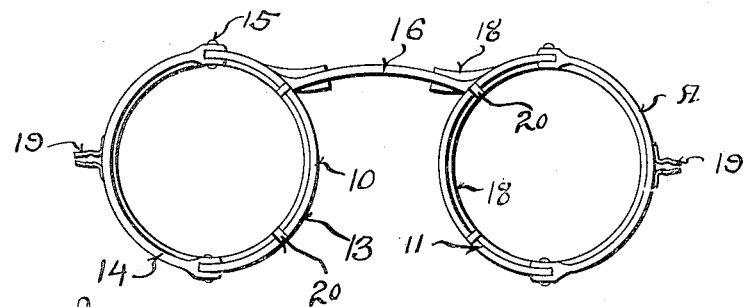
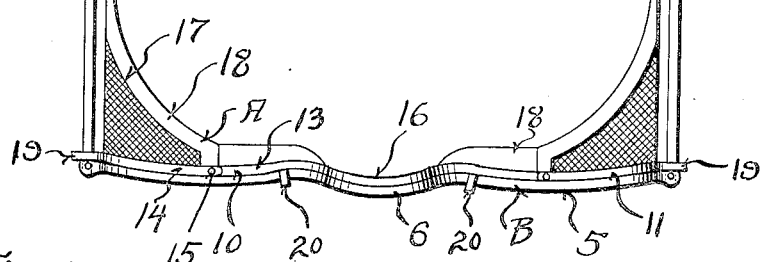
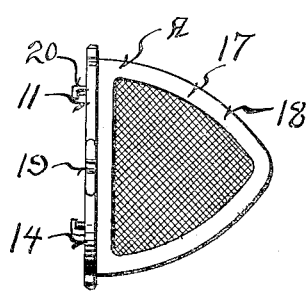

Patented June 20, 1933

1,914,931

UNITED STATES PATENT OFFICE

JOHN A. TYNAN, OF NORTH FOND DU LAC, WISCONSIN

GOGGLE ATTACHMENT

Application filed August 22, 1932. Serial No. 629,846.

This invention appertains to eye glasses and has for one of its primary objects the provision of novel means for converting an ordinary pair of eye glasses or spectacles into goggles, thereby eliminating the necessity of providing separate pairs of eye glasses and goggles and special lenses for the goggles to suit the individual requirements of the wearer.

In driving motor vehicles and in special kinds of work, it is customary for persons to wear goggles so as to exclude the entrance of dust, dirt, grit and the like into the eyes. In some instances, persons will endeavor to wear both the ordinary glasses and the goggles. This results in a cumbersome and heavy arrangement and does not work out satisfactorily.

It is therefore another salient object of my invention to provide a goggle attachment for an ordinary pair of eye glasses or spectacles which can be readily and quickly detachably secured to the frame of the glasses and which will form intimate contact with the temples of the wearer and around the wearer's eyes and thus, effectively prevent the entrance of all dust and dirt into the eyes of the wearer.

A further important object of my invention is to provide a goggle attachment for eye glasses comprising a pair of open frames for detachably engaging the frames of the eye glasses with side guards for the temples of the wearer formed from screen or like mesh with pads on the frames of the goggles for engaging the face of the wearer about the eyes, the wire mesh allowing ventilation without danger of grit getting into the wearer's eyes.

A further important object of my invention is the provision of novel means for forming the frames of the goggles, whereby the same can be folded so as to occupy a minimum amount of space in the wearer's pocket, when the same are not in use.

A still further object of my invention is to provide a goggle attachment for eye glasses of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which:

Figure 1 is a front elevation of my improved attachment.

Figure 2 is a top plan view thereof showing the same attached to an ordinary pair of spectacles.

Figure 3 is an end elevation of the goggle attachment.

Referring to the drawing in detail, wherein similar reference characters designate the corresponding parts throughout the several views, the letter A generally indicates my improved goggle attachment and B a pair of spectacles with which the same can be associated.

The spectacles B can be of any preferred character or make and includes the usual frames 5 for receiving the lenses (not shown). The lens frames 5 are connected by the usual bridge piece 6 and bows 7 are pivotally connected to the outer ends of the frames.

My improved attachment A comprises substantially circular side frames 10 and 11 and these side frames 10 and 11 conform closely to the shape and configuration of the spectacle frames. In accordance with my invention, the side frames 10 and 11 are formed from companion inner and outer semi-circular sections 13 and 14. These sections are connected together by means of pivot pins 15 and this allows the frames to be collapsed, so as to occupy a minimum amount of space when the attachment is not in use. The inner semi-circular sections of the frames 10 and 11 can be connected together by a bridge piece 16.

Formed on the outer semi-cylindrical sections 14 are temple guards 17, which are shaped to conform to the face of the wearer and to snugly engage the same. These side temple guards 17 can be formed of wire mesh or other foraminous material so as to permit ventilation. Cushion pads 18 are carried by the temple guards 17 and by the frames 10 and 11 and these cushion pads are adapted to engage the face of the wearer around the eyes and around the temples, so as to preclude the entrance of dirt, dust and the like into the eyes of the wearer.

In order to permit the convenient attaching of my device to an ordinary pair of glasses, the outer sections 14 can carry resilient clips or loops 19 for gripping the bows 17 of the spectacles. Likewise, the inner circular sections can carry clips 20 for gripping over the frame of the spectacles.

As previously noted, the inner semicircular sections of the frames 10 and 11 may be connected by bridge piece 16, but it is understood that in some instances I may dispense with the nose piece without departing from the spirit of my invention.

From the foregoing description, it can be seen that I have provided a goggle attachment for spectacles which can be readily and quickly connected with an ordinary pair of eye glasses without adding undue weight to the eye glasses and which will entirely eliminate the necessity of providing lenses for the goggle attachment.

Likewise, due to the novel formation of the attachment, the temple guards 17 can be readily folded over the inner portions of the attachment and thereby make a compact device for carrying in the pocket.

Changes in details may be made without departing from the spirit or the scope of this invention, but what I claim as new is:

1. A goggle attachment for an ordinary pair of eye glasses comprising substantially circular frame members each including inner and outer curved sections pivotally connected together at their inner ends, a bridge piece connecting the inner sections together, cushion padding carried by the sections for snugly engaging about the eyes of the wearer, and clips or loops carried by the sections for detachably engaging the eye glasses.

2. A goggle attachment for eye glasses comprising substantially circular frames, each including inner and outer circular sections pivotally connected together, a bridge piece connecting the inner sections together, rearwardly extending temple guards formed of mesh material, cushion pads carried by the frames, and temple guards for snugly engaging the face of the wearer, and clips or loops carried by the frames for detachably engaging the eye glasses.

3. A goggle attachment for eye glasses comprising a pair of like substantially circular frames, each including inner and outer semicircular sections, means pivotally connecting the meeting ends of the sections together, whereby the outer sections can be folded over the inner sections, a bridge piece connecting the inner sections together, rearwardly directed side guards of mesh material connected with the outer sections, cushion pads carried by the side guards and inner sections for snugly engaging the face of the wearer, outwardly extending clips or loops formed on the outer sections for clamping engagement with the bows of an ordinary pair of glasses, and clips carried by the inner sections for clamping engagement with the frame of said glasses.

In testimony that I claim the foregoing I have hereunto set my hand at North Fond du Lac, in the county of Fond du Lac and State of Wisconsin.

JOHN A. TYNAN.